Aug. 2, 1927.

M. H. KOTZEBUE

SEPARATOR

Filed April 21, 1926

1,637,947

INVENTOR
M. H. Kotzebue
BY
ATTORNEYS

Patented Aug. 2, 1927.

1,637,947

UNITED STATES PATENT OFFICE.

MEINHARD H. KOTZEBUE, OF TULSA, OKLAHOMA.

SEPARATOR.

Application filed April 21, 1926. Serial No. 103,550.

My present invention relates generally to separators particularly useful in the recovery of natural gasoline from natural gas, and more especially to separators of the type wherein natural gas is caused to pass through an absorbing medium, usually mineral seal oil, and the effectiveness of the operation is in direct proportion to the surface contact between the gas and the absorbing medium.

Various devices have been resorted to to increase this surface contact, including the separation of the gas at high velocity, which produces a foam on the surface of the absorbing medium, or oil but which reduces the efficiency as a whole on account of the velocity of the gas.

It is a primary object of my invention to produce a foam upon the surface of the oil so as to thereby increase the surface contact between the gas and the oil, without resorting to high velocity of the gas or other means decreasing in the general efficiency of the operation.

More especially my invention aims to produce foam on the surface of the oil, and in this way increase the surface contact by mechanical means capable of assisting rather than defeating the operation, and capable of ready introduction in connection with the bubble trays of separators for this general purpose, without adding materially to the cost thereof.

In the accompanying drawing which illustrates my present invention and forms a part of this specification:—

Figure 1:
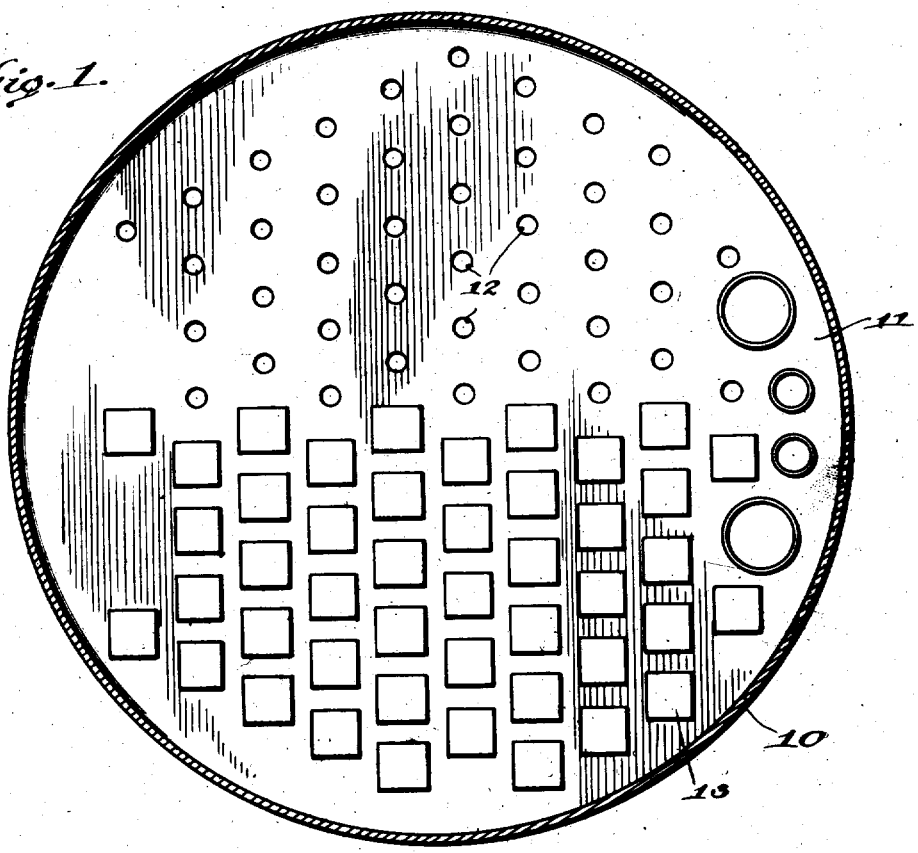
Figure 2:
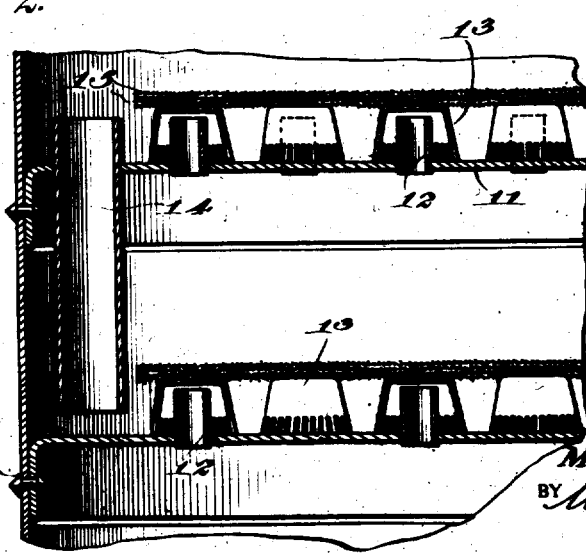

Figure 1 is a horizontal section through a separator of the type to which my invention is especially applicable, one of the bubble trays being seen in top plan view, and, Figure 2 is a partial vertical section through the separator and through portions of the two vertically spaced bubble trays.

Referring now to these figures, the casing of the separator is seen at 10, having therein bubble trays 11 in the vertically spaced relation as shown in Fig. 2, which extend across the entire interior of the separator casing, and are secured around their edges to the latter.

Each of the trays 11 has therethrough a series of openings within which are secured the lower ends of upstanding tubular chimneys 12, whose upper ends open within caps 13 disposed around the chimneys with their lower slotted edges in contact with the upper surface of the tray.

In practice mineral oil is held on each of the trays to the level of the tops of the chimneys 12 and to the level of the top of an overflow pipe 14, with which each tray is equipped. Each of these pipes has its upper end open at the oil level and has its lower portion depending into the oil upon the surface of the next lowermost tray.

In an apparatus of this type wherein the gas flows upwardly through the chimneys and into the caps, and then through the slots of the lower edges of the caps upwardly through the gasoline absorbing oil, my invention purposes a means of producing foam in this action upon the surface of the oil, the said means consisting of a series of layers of reticulate or foraminous material, indicated at 15, resting upon one another and upon the tops of the caps 13, these layers of material extending over each tray except above the overflow pipes 14. In practice the layers 15 of foraminous material are placed about one inch above what would be the normal level of the mineral seal oil. However, as the gas passes through the oil, it is agitated and the level is raised on account of being made lighter by reason of the gas being in the oil. The foraminous material breaks these bubbles into smaller bubbles thereby causing froth and foam. The layers of material 15 therefore bring about the production of the foam and support the same, and thus in the operation with the layers of material in place above the surface of the oil, the gas passes through the oil then through the layers of material 15, and then through the foam and the effect of this is to greatly increase the surface contact and in the same proportion increase the effectiveness and efficiency of the operation.

Obviously my invention is capable of ready application to new separators, as well as those already in use with little additional expense, and will be lasting and durable in use without requiring adjustment or special care.

I claim:—

1. A bubble tray for separators of the type described having chimneys upstanding therethrough, and slotted caps over the chimneys, and means consisting of a series of layers of reticulate material supported by the caps above the upper ends of the chimneys arranged to produce and support foam in operation, as described.

2. In a separator for separating gasoline from natural gas having a tray therein and means in connection with the tray providing for the upward passage of gas therethrough, means arranged to define a level on the tray for a gasoline absorbing medium, and means consisting of a series of layers of reticulate material supported in connection with the tray above the level of the gasoline absorbing medium and arranged to produce and support foam whereby to increase the surface contact between the gas and the gasoline absorbing medium, as described.

3. An apparatus for separating gasoline from natural gas consisting of a reaction tower provided with a series of trays, forming a series of compartments within the tower, each of said trays being provided with a plurality of apertures through each of which is fitted a tube for the passage of gas from one of said compartments to the adjacent compartment, each tube being covered with a slotted cap, means for maintaining a definite level of liquid within each compartment, and means consisting of a plurality of layers of reticulated members supported upon said slotted caps and adapted to bring about the formation of froth through the reduction in size of the bubbles resulting from the intermixing of the gas and liquid within the compartment.

MEINHARD H. KOTZEBUE.